United States Patent
Park et al.

(10) Patent No.: US 10,817,138 B2
(45) Date of Patent: Oct. 27, 2020

(54) DEVICE AND METHOD FOR INPUT PROCESS

(71) Applicant: SAMSUNG ELECTRONICS CO., LTD., Suwon-si (KR)

(72) Inventors: Keun Joo Park, Suwon-si (KR); Tae Young Ha, Suwon-si (KR); So Young Lee, Suwon-si (KR); Hyun Surk Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 263 days.

(21) Appl. No.: 15/311,021

(22) PCT Filed: Mar. 10, 2015

(86) PCT No.: PCT/KR2015/002265
§ 371 (c)(1),
(2) Date: Nov. 14, 2016

(87) PCT Pub. No.: WO2015/174623
PCT Pub. Date: Nov. 19, 2015

(65) Prior Publication Data
US 2017/0083187 A1  Mar. 23, 2017

(30) Foreign Application Priority Data

May 16, 2014  (KR) .................. 10-2014-0058972

(51) Int. Cl.
*G06F 3/01* (2006.01)
*G06F 3/0482* (2013.01)
*G06F 3/16* (2006.01)

(52) U.S. Cl.
CPC .............. *G06F 3/0482* (2013.01); *G06F 3/01* (2013.01); *G06F 3/017* (2013.01); *G06F 3/167* (2013.01)

(58) Field of Classification Search
CPC ........ G06F 3/0482; G06F 3/017; G06F 3/167; G06F 3/01
See application file for complete search history.

(56) References Cited

U.S. PATENT DOCUMENTS 8,787,663 B2 * 7/2014 Litvak ................ G06K 9/00375
382/165
9,383,895 B1 * 7/2016 Vinayak .................. G06F 3/017
(Continued)

FOREIGN PATENT DOCUMENTS

| JP | 2012-027515 A | 2/2012 |
| JP | 2013-016060 A | 1/2013 |

(Continued)

OTHER PUBLICATIONS

International Search Report (PCT/ISA/210) dated May 13, 2015 issued by the International Searching Authority in counterpart International Application No. PCT/KR2015/002265.
(Continued)

*Primary Examiner* — Shen Shiau
(74) *Attorney, Agent, or Firm* — Sughrue Mion, PLLC

(57) ABSTRACT

An apparatus and a method for processing an input are provided. The apparatus includes a shape identifier configured to identify a first shape corresponding to a user input among shapes, a pattern identifier configured to identify a first pattern corresponding to the user input among patterns, and a determiner configured to determine a first command corresponding to the first shape and the first pattern.

2 Claims, 12 Drawing Sheets

(56) References Cited

U.S. PATENT DOCUMENTS

| | | | | |
|---|---|---|---|---|
| 9,690,388 B2* | 6/2017 | Cronholm | | G06F 3/017 |
| 9,874,977 B1* | 1/2018 | Soyannwo | | G06F 3/042 |
| 2004/0193413 A1* | 9/2004 | Wilson | | G06F 3/013 |
| | | | | 704/243 |
| 2006/0125803 A1* | 6/2006 | Westerman | | G06F 3/04883 |
| | | | | 345/173 |
| 2006/0209021 A1* | 9/2006 | Yoo | | G06F 3/017 |
| | | | | 345/156 |
| 2007/0252898 A1* | 11/2007 | Delean | | G06F 3/005 |
| | | | | 348/211.99 |
| 2007/0283296 A1* | 12/2007 | Nilsson | | G06F 3/017 |
| | | | | 715/863 |
| 2008/0244465 A1* | 10/2008 | Kongqiao | | G06F 3/017 |
| | | | | 715/863 |
| 2009/0109036 A1* | 4/2009 | Schalla | | B64D 11/0626 |
| | | | | 340/573.1 |
| 2010/0138785 A1* | 6/2010 | Uoi | | G06F 3/017 |
| | | | | 715/810 |
| 2010/0325590 A1* | 12/2010 | Homma | | G06F 3/011 |
| | | | | 715/863 |
| 2011/0018795 A1* | 1/2011 | Jang | | G06F 3/0304 |
| | | | | 345/156 |
| 2011/0107216 A1* | 5/2011 | Bi | | G06F 3/017 |
| | | | | 715/716 |
| 2011/0141009 A1* | 6/2011 | Izumi | | A63F 13/04 |
| | | | | 345/156 |
| 2011/0197263 A1* | 8/2011 | Stinson, III | | G06F 3/0484 |
| | | | | 726/4 |
| 2011/0221666 A1* | 9/2011 | Newton | | G06F 3/04883 |
| | | | | 345/156 |
| 2011/0221974 A1* | 9/2011 | Stern | | G06F 3/017 |
| | | | | 348/734 |
| 2011/0239118 A1* | 9/2011 | Yamaoka | | G06F 3/017 |
| | | | | 715/709 |
| 2011/0296333 A1* | 12/2011 | Bateman | | G06F 3/04886 |
| | | | | 715/773 |
| 2011/0296353 A1* | 12/2011 | Ahmed | | G06F 3/04815 |
| | | | | 715/848 |
| 2011/0304540 A1* | 12/2011 | Nishimoto | | A63F 13/42 |
| | | | | 345/158 |
| 2012/0007857 A1* | 1/2012 | Noda | | G06F 3/04812 |
| | | | | 345/419 |
| 2012/0023453 A1* | 1/2012 | Wagner | | G06F 3/04886 |
| | | | | 715/848 |
| 2012/0050007 A1 | 3/2012 | Forutanpour et al. | | |
| 2012/0050270 A1* | 3/2012 | Noda | | G06F 3/04842 |
| | | | | 345/419 |
| 2012/0069055 A1* | 3/2012 | Otsuki | | H04N 13/356 |
| | | | | 345/681 |
| 2012/0127156 A1* | 5/2012 | Goossens | | G06F 3/0482 |
| | | | | 345/419 |
| 2012/0182296 A1* | 7/2012 | Han | | G06F 3/04883 |
| | | | | 345/419 |
| 2012/0206348 A1* | 8/2012 | Kim | | G06F 3/0304 |
| | | | | 345/158 |
| 2012/0274583 A1* | 11/2012 | Haggerty | | G06F 3/0488 |
| | | | | 345/173 |
| 2012/0314902 A1* | 12/2012 | Kimura | | G06F 3/017 |
| | | | | 382/103 |
| 2013/0069867 A1* | 3/2013 | Watanabe | | G06F 3/0482 |
| | | | | 345/156 |
| 2013/0106742 A1* | 5/2013 | Lee | | G06F 3/0484 |
| | | | | 345/173 |
| 2013/0176298 A1* | 7/2013 | Lee | | G06F 3/0485 |
| | | | | 345/419 |
| 2013/0181897 A1* | 7/2013 | Izumi | | G06F 3/017 |
| | | | | 345/156 |
| 2013/0222274 A1* | 8/2013 | Mori | | B60K 37/06 |
| | | | | 345/173 |
| 2013/0229499 A1* | 9/2013 | Zhao | | G06K 9/00355 |
| | | | | 348/51 |
| 2013/0343601 A1* | 12/2013 | Jia | | G06F 3/011 |
| | | | | 382/103 |
| 2014/0007020 A1* | 1/2014 | Park | | G06F 3/017 |
| | | | | 715/863 |
| 2014/0007022 A1* | 1/2014 | Tocino Diaz | | G06F 3/017 |
| | | | | 715/863 |
| 2014/0011547 A1* | 1/2014 | Jingushi | | H04B 1/3827 |
| | | | | 455/566 |
| 2014/0013417 A1* | 1/2014 | Sakai | | G06F 3/005 |
| | | | | 726/16 |
| 2014/0022171 A1* | 1/2014 | Yanai | | G06F 3/017 |
| | | | | 345/158 |
| 2014/0022184 A1* | 1/2014 | Bathiche | | G10L 15/24 |
| | | | | 345/173 |
| 2014/0053115 A1* | 2/2014 | Perski | | G06F 3/017 |
| | | | | 715/863 |
| 2014/0101578 A1* | 4/2014 | Kwak | | G06F 1/1647 |
| | | | | 715/761 |
| 2014/0104168 A1* | 4/2014 | Hegde | | G06F 3/017 |
| | | | | 345/157 |
| 2014/0118244 A1* | 5/2014 | Kaplan | | G06F 3/017 |
| | | | | 345/156 |
| 2014/0172231 A1* | 6/2014 | Terada | | G06K 9/00832 |
| | | | | 701/36 |
| 2014/0201666 A1* | 7/2014 | Bedikian | | G06F 3/017 |
| | | | | 715/771 |
| 2014/0375547 A1* | 12/2014 | Katz | | G06F 3/0346 |
| | | | | 345/156 |
| 2015/0029092 A1* | 1/2015 | Holz | | G06F 3/017 |
| | | | | 345/156 |
| 2015/0054729 A1* | 2/2015 | Minnen | | G06K 9/00375 |
| | | | | 345/156 |
| 2015/0084859 A1* | 3/2015 | Itzhaik | | G06F 3/017 |
| | | | | 345/156 |
| 2016/0061619 A1* | 3/2016 | Kishore | | G01C 21/3664 |
| | | | | 701/400 |
| 2016/0231824 A1* | 8/2016 | Kim | | G06F 1/1626 |
| 2019/0079589 A1* | 3/2019 | Spalla | | G06F 3/017 |

FOREIGN PATENT DOCUMENTS

| | | |
|---|---|---|
| JP | 2013-137822 A | 7/2013 |
| KR | 10-2008-0050994 A | 6/2008 |
| KR | 10-2010-0000174 A | 1/2010 |
| KR | 10-2011-0028809 A | 3/2011 |
| KR | 10-2012-0000663 A | 1/2012 |
| KR | 10-2012-0026956 A | 3/2012 |
| KR | 10-2012-0055434 A | 5/2012 |
| KR | 10-2012-0080074 A | 7/2012 |
| KR | 10-2013-0124061 A | 11/2013 |
| KR | 10-2014-0017829 A | 2/2014 |

OTHER PUBLICATIONS

Written Opinion (PCT/ISA/237) dated May 13, 2015 issued by the International Searching Authority in counterpart International Application No. PCT/KR2015/002265.

* cited by examiner

DEVICE AND METHOD FOR INPUT PROCESS

CROSS-REFERENCE TO RELATED APPLICATIONS

This application is a U.S. national stage application under 35 U.S.C. § 371 of International Application No. PCT/KR2015/002265, filed on Mar. 10, 2015, in the Korean Intellectual Property Office, which claims priority from Korean Patent Application No. 10-2014-0058972, filed on May 16, 2014, in the Korean Intellectual Property Office, the disclosures of which are incorporated herein by reference in their entireties.

BACKGROUND

1. Field

Apparatuses and methods consistent with example embodiments relate to an input processing apparatus and an input processing method, more particularly, to a method and an apparatus for identifying a user input, determining a command corresponding to the identified user input, and processing the determined command.

2. Description of the Related Art

With developments of smart devices, various input devices have been developed to allow users to conveniently control the smart devices. Also, a method using a gesture and a voice of a user as a user input as well as a touch input performed through a touchscreen or an input device such as a mouse, a keyboard, and a remote control has been developed.

Because the smart device has been enabled to detect the user input based on various input devices, a necessity of a convenient manipulation for controlling the smart device has also appeared. Although current smart devices support various input devices, a range through which the smart device is controlled may vary based on the input device, and a changeover between input interfaces may be manually performed in general.

SUMMARY

According to example embodiments, there is provided an apparatus for processing an input, the apparatus including a shape identifier configured to identify a first shape corresponding to a user input among shapes, a pattern identifier configured to identify a first pattern corresponding to the user input among patterns, and a determiner configured to determine a first command corresponding to the first shape and the first pattern.

The apparatus may further include a voice identifier configured to analyze a user voice associated with the user input, and identify a voice command corresponding to the analyzed user voice.

The determiner may be further configured to determine a second command corresponding to the first shape, the first pattern, and the voice command.

The pattern identifier may be further configured to identify a speed corresponding to a portion of the user input, and identify a second pattern corresponding to the first pattern and the speed.

The apparatus may further include a parser configured to parse a combination of the first shape and the first pattern into sub-combinations.

The determiner may be further configured to determine a second command corresponding to the sub-combinations.

The apparatus may further include a depth identifier configured to identify a depth corresponding to the user input, and the determiner may be further configured to determine a second command corresponding to the first shape, the first pattern, and the depth.

The shape identifier may be further configured to identify a second shape corresponding to the user input, the second shape differing from the first shape, and the determiner may be further configured to determine a second command corresponding to the first pattern and the second shape, a hierarchy level of the second command differing from a hierarchy level of the first command, among command hierarchy levels.

The first command may be a file move command, and the second command may be a folder move command.

In a media application, the first command may be a content move command, and the second command may be a category move command.

In an image viewer application, the first command may be an image move command, and the second command may be an album move command.

According to example embodiments, there is provided an apparatus for processing an input, the apparatus including a depth identifier configured to identify a first depth corresponding to a user input, a pattern identifier configured to identify a pattern corresponding to the user input among patterns, and a determiner configured to determine a first command corresponding to the pattern and the first depth.

The depth identifier may be further configured to identify a second depth corresponding to the user input, and the determiner may be further configured to determine a second command corresponding to the pattern and the second depth, a hierarchy level of the second command differing from a hierarchy level of the first command, among command hierarchy levels.

The second depth may correspond to the hierarchy level of the second command, and the second command may be a level move command.

The apparatus may further include a parser configured to parse a combination of the first depth and the pattern into sub-combinations, and the determiner may be further configured to determine a second command corresponding to the sub-combinations.

According to example embodiments, there is provided a method of processing an input, the method including identifying a first shape corresponding to a user input among shapes, identifying a pattern corresponding to the user input among patterns, and determining a first command corresponding to the first shape and the pattern.

The method may further include analyzing a user voice associated with the user input, identifying a voice command corresponding to the analyzed user voice, and determining a second command corresponding to the first shape, the pattern, and the voice command.

According to example embodiments, there is provided a method of processing an input, the method including identifying a depth corresponding to a user input, identifying a pattern corresponding to the user input among gesture patterns, and determining a first command corresponding to the depth and the pattern.

The method may further include parsing a combination of the pattern and the depth into sub-combinations.

The method may further include determining a second command corresponding to the sub-combinations.

BRIEF DESCRIPTION OF THE DRAWINGS

The above and/or other aspects will be more apparent by describing example embodiments with reference to the accompanying drawings.

DETAILED DESCRIPTION

Hereinafter, example embodiments will be described in detail with reference to the accompanying drawings. It may be understood, however, that there is no intent to limit this disclosure to the example embodiments disclosed. Like numbers refer to like elements throughout the description of the figures.

Terminologies used herein are defined to appropriately describe the example embodiments of the present disclosure and thus may be changed depending on a user, the intent of an operator, or a custom. Accordingly, the terminologies may be defined based on the following overall description of this specification. It will be further understood that terms, such as those defined in commonly used dictionaries, may be interpreted as having a meaning that is consistent with their meaning in the context of the relevant art and will not be interpreted in an idealized or overly formal sense unless expressly so defined herein.

It will be understood that the terms such as "unit," "-er (-or)," and "module" described in the specification refer to an element for performing at least one function or operation, and may be implemented in hardware, software, or the combination of hardware and software.

Figure 1:
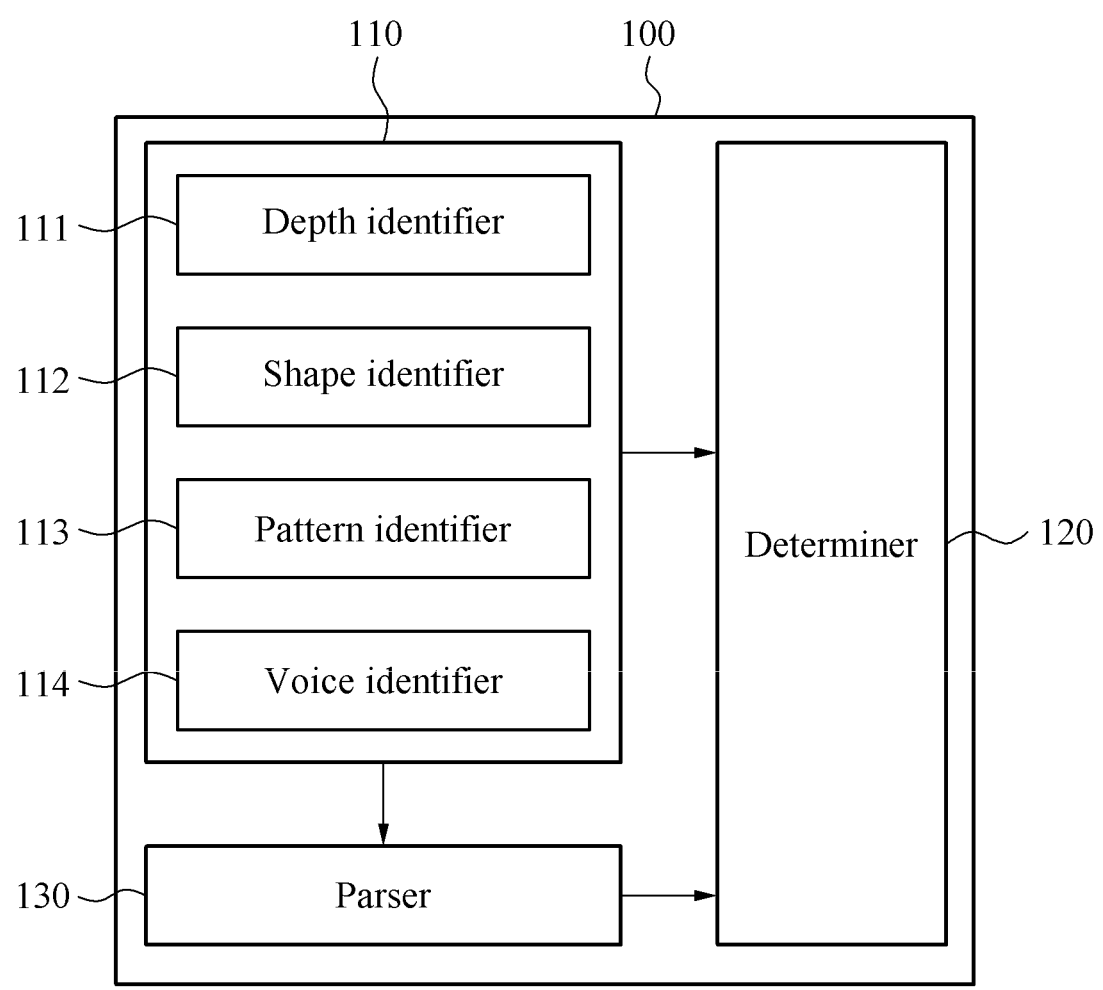
FIG. 1 is a block diagram illustrating an input processing apparatus according to an example embodiment.

FIG. 1 is a block diagram illustrating an input processing apparatus according to an example embodiment.

An input processing apparatus 100 may include an identifier 110, a determiner 120, and a parser 130. The identifier 110 may identify a gesture input and a voice input of a user. For diversified classification of the gesture input of the user, the identifier 110 may include a depth identifier 111, a shape identifier 112, and a pattern identifier 113 to identify the gesture input based on a depth value, a shape, and a pattern of a gesture. Also, the identifier 110 may further include a voice identifier 114 to combine the voice input and the gesture input.

The depth identifier 111 may identify a first depth value corresponding to the gesture input of the user. The gesture input may be sensed in response to a gesture of the user in a space separating from the input processing apparatus 100. Thus, the depth identifier may identify a depth value based on a distance between the user and the input processing apparatus 100 and classify the gesture input of the user.

For example, when the distance between the user and the input processing apparatus 100 decreases, the depth value of the gesture input may decrease and thus, a movement to a lower level folder may occur. When the distance between the user and the input processing apparatus 100 increases, the depth value of the gesture input may increase and thus, a movement to a higher level folder may occur. Also, when the depth value of the gesture input corresponds to a folder of a predetermined hierarchy level, a movement to the folder of the hierarchy level may occur without receiving an additional gesture input.

Here, a hierarchy level may be a unit hierarchically classified in a data structure. For example, a higher level folder including a first folder may have a hierarchy level higher than that of the first folder and a lower level folder included in the first folder may have a hierarchy level lower than that of the first folder.

The shape identifier 112 may identify a first shape corresponding to the gesture input of the user among a plurality of shapes. The gesture input may be classified such that a command is executed based on a gesture shape of the user. The shape identifier 112 may sense the gesture input of the user through an image recognizing sensor and identify the first shape corresponding to the gesture input of the user among a plurality of shapes set in advance.

For example, a gesture input shape of the user may be classified as a pointing shape corresponding to a one finger lifting shape, a two fingers lifting shape, a hand opening shape, and a fisting shape. Also, the gesture input shape of the user may be classified as a preset shape that is expressed by the user.

The pattern identifier 113 may identify a first pattern corresponding to the gesture input of the user among a plurality of patterns. The gesture input may be classified such that a command is executed based on a gesture pattern of the user. The pattern identifier 113 may sense the gesture input of the user through the image recognizing sensor and identify the first pattern corresponding to the gesture pattern of the user among a plurality of patterns set in advance.

For example, the gesture input pattern may be classified as a circling pattern, a horizontal moving pattern, a vertical moving pattern, and a pattern that describes a predetermined shape. Also, the gesture input pattern may be classified as a preset gesture pattern that is expressed by the user.

The pattern identifier 113 may identify a first speed of the gesture pattern and identify a second pattern corresponding to the first speed. The user may input the same gesture pattern at different speeds. Thus, the first speed may be used as an additional factor for classifying the gesture pattern. In this example, the first pattern may also be classified as a second pattern based on a speed.

The pattern identifier 113 may identify a first iteration count of the gesture pattern and identify a third pattern corresponding to the first pattern and the first iteration count. The user may repeat the same gesture pattern and thus, the first iteration count of the first pattern may be used as an additional factor for classifying the gesture pattern. Also, both speed and iteration count may be used to classify the gesture pattern.

The voice identifier 114 may analyze a user voice associated with a user input and identify a first voice command corresponding to the user voice. The user voice may be sensed through a voice recognizing sensor. Also, the user voice may be classified such that a different command is executed based on a voice input of the user in response to the same gesture input of the user.

As the foregoing, the gesture input of the user may be differently classified based on any one or any combination of the depth value, the shape, and the pattern of the gesture input. Also, the gesture input may be further classified based on the voice input.

The determiner 120 may determines a first command corresponding to a combination of at least two of the depth value, the shape, and the pattern of the identified gesture input. The combination may be, for example, a combination of the first change and the first pattern of the gesture input, a combination of the first depth value and the first pattern of the gesture input, a combination of the first depth value and the first shape of the gesture input, and a combination of the first shape, the first depth value and the first pattern of the gesture input.

When the first pattern and a second shape differing from the first shape correspond to the user input, the determiner 120 may determine a command corresponding to a combination of the second shape and the first pattern. Among a plurality of command hierarchies, the command corresponding to the combination of the second shape and the first pattern may have a hierarchy level different from that of the first command.

For example, in the combination of the first shape and the first pattern, the first pattern of the gesture input may correspond to a different command based on the first shape. The one finger lifting shape may correspond to a file move command, and the hand opening shape may correspond to a folder move command.

Also, the one finger lifting shape may correspond to a command indicating a movement to a one-level-up or one-level-down folder, and the two fingers lifting shape may correspond to a command indicating a movement to a two level-up or level-down folder.

The determiner 120 may enable a different command to be executed based on an application.

For example, in the media application, the one finger lifting shape gesture may correspond to a command indicating a movement to a list of music or video being currently played. Also, the hand opening shape gesture may correspond to a command indicating a movement to a category into which the music or video is classified.

Also, in an image viewer application, the one finger lifting shape gesture may correspond to a command indicating a movement of an image, and the hand opening shape gesture may correspond to a command indicating a movement to a category into which the image is classified.

The media application and the image viewer application in which the classification is performed based on the gesture shape are an example and thus, a type of application is not limited thereto. It is obvious to those skilled in the art that the present disclosure is also applicable to various applications.

In the combination of the first depth value and the first pattern, the determiner 120 may determine a different command based on the depth value despite the same first pattern of the gesture input.

When the first depth value and a second depth value differing from the first pattern correspond to the user input, the determiner 120 may determine a command corresponding to a combination of the second depth value and the first pattern. Among a plurality of command hierarchies, the command corresponding to the combination of the second depth value and the first pattern may have a hierarchy level differing from that of the first command.

A decrease in the depth value of the gesture input of the user may indicate a decrease in a distance between the user and the input supporting apparatus 100. The user may intuitively recognize such decrease when the user selects a file or move the file to a lower level folder. Conversely, an increase in the depth value of the gesture input of the user may indicate an increase in the distance between the user and the input supporting apparatus 100. The user may intuitively recognize such increase when the user moves the file to a higher level folder.

Also, a movement by at least two levels may be performed through a single gesture input. A movement to a corresponding hierarchy level based on a change in a gesture input depth value of a user may be performed without need to perform an additional operation.

For example, when an amount of change in the gesture input depth value of the user corresponds to a hierarchy level of a two-level-down folder, the movement to the two-level-down folder may be performed through the single gesture input of the user.

The determiner 120 may determine a second command corresponding to a combination of at least two of the pattern, the shape, and the depth value of the gesture input and the first voice command identified through the voice identifier 114. The determiner 120 may determine a different command based on the first voice command despite the same combination.

For example, a file move command or a folder move command may be determined based on the first voice command despite the same gesture shape and the same gesture pattern. Through this, a type of user input may be diversely classified without a complex gesture input.

The parser 130 may parse a combination of at least two of the pattern, the shape, and the depth value of the gesture input of the user into a plurality of sub-combinations. The gesture input may be formed in a single unit and also be formed in a continuous motion. In this example, the parser 130 may parse the gesture input in a unit by which a single continuous gesture is classified as a single input.

The determiner 120 may determine at least one command corresponding to the plurality of sub-combinations. In response to a determination of one command corresponding to the plurality of sub-combinations into which the gesture input is parsed by the parser 130, the single continuous gesture input may be parsed into a unit of sub-combination and a command corresponding to the sub-combination may be determined.

Through this, the user may deliver the gesture input to the input supporting apparatus 100 based on the single continuous gesture input without need to repeating the gesture input in the unit by which the single continuous gesture is classified as the single input.

For example, the user may change the value of the gesture input, select a folder with the single gesture input based on a gesture pattern of continuously moving leftward and rightward, and move a file in the folder.

Figure 2:
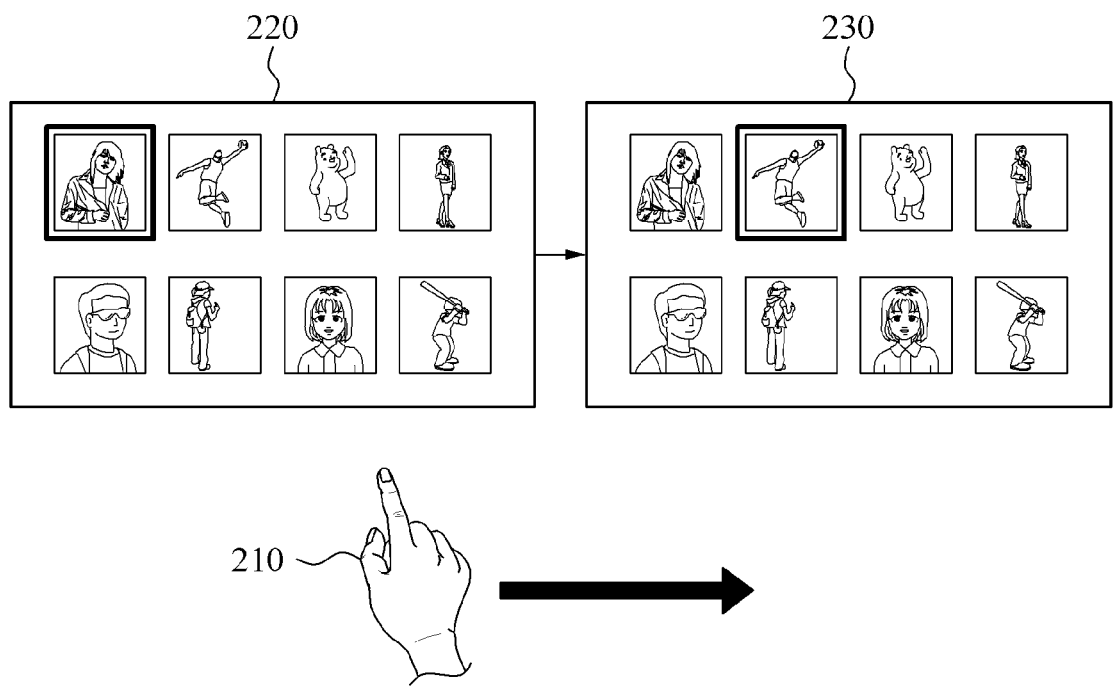
FIGS. 2 and 3 are diagrams each illustrating a screen displaying a file movement or a folder movement based on a shape of a user input, according to an example embodiment.
Figure 3:
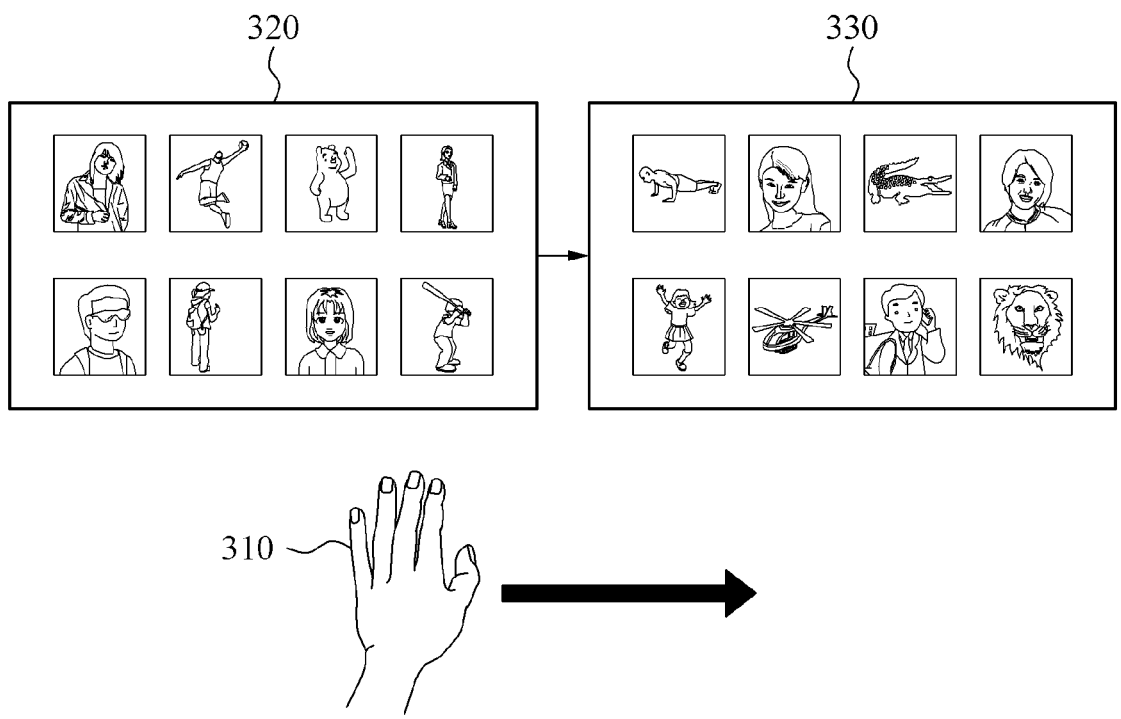

FIGS. 2 and 3 are diagrams each illustrating a screen displaying a file movement or a folder movement based on a shape of a user input, according to an example embodiment.

FIG. 2 illustrates a screen displaying a file movement based on a pointing shape gesture 210 that a user lifts one finger. A screen 220 may display a state in which a first file is selected. A screen 230 may display a state in which a movement to a second file occurs based on a pattern that the pointing shape gesture 210 moves rightward.

FIG. 3 illustrates a screen displaying a folder movement based on a hand opening shape gesture 310. A screen 320 may display files in a selected folder. A screen 330 may display a state in which the files are moved to another folder based on a pattern that the hand opening shape gesture 310 moves rightward.

As described in the examples of FIGS. 2 and 3, based on a shape of a gesture, the pointing shape gesture 210 may correspond to an individual file move command and the hand opening shape gesture 310 may correspond to a folder move command.

Despite the same pattern, a hierarchy level of executing a command may be classified as a file level or a folder level based on the shape of the gesture. Thus, the user may deliver a command classified based on a differing shape of the gesture to the input processing apparatus 100 through the gesture input.

The foregoing descriptions of FIGS. 2 and 3 are an example and thus, various commands may be set to correspond to a gesture shape based on a setting of a user.

Figure 4:
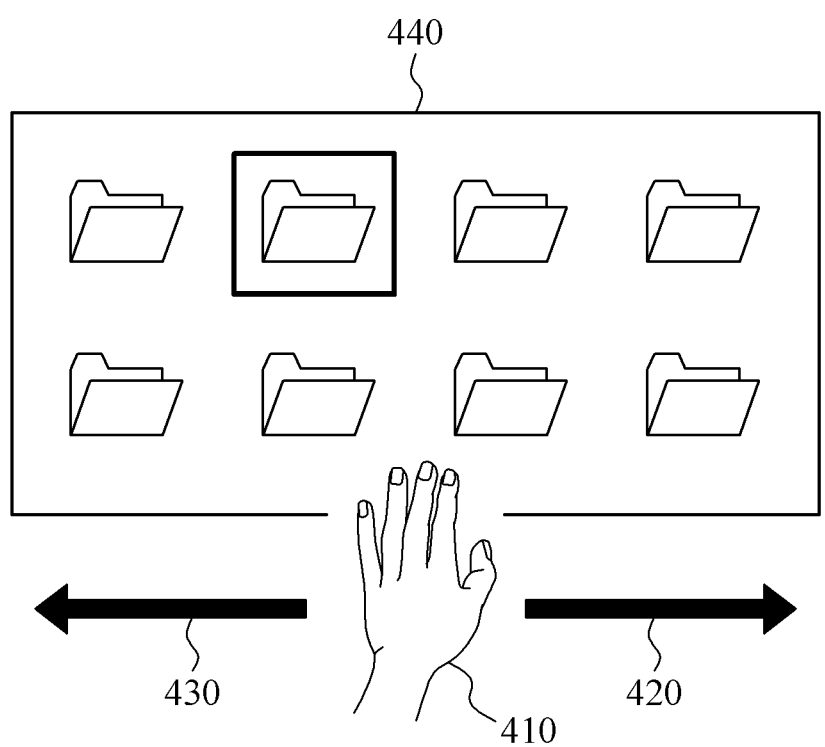
FIGS. 4 and 5 are diagrams each illustrating a screen displaying a same hierarchy level movement or a lower hierarchy level movement based on a depth value of a user input, according to an example embodiment.
Figure 5:
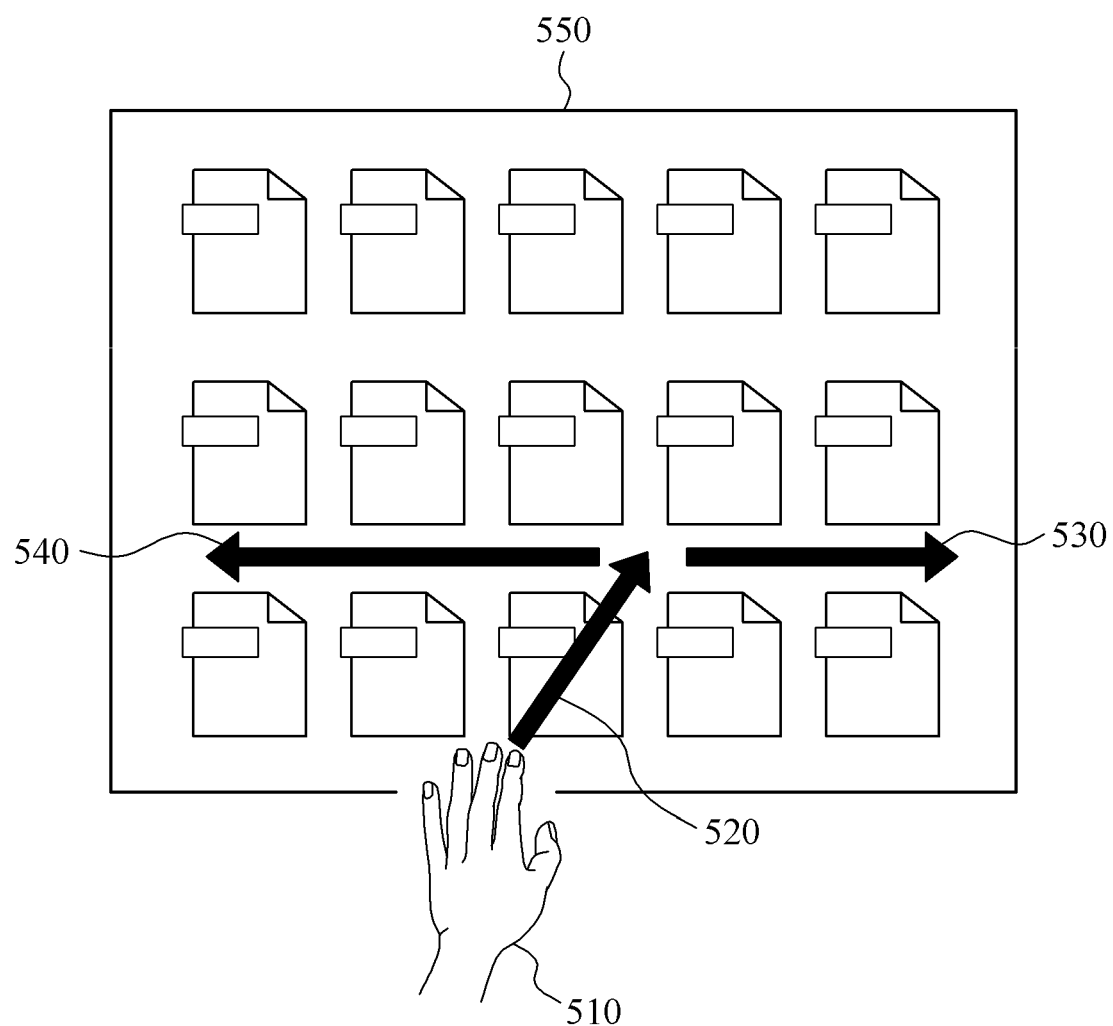

FIGS. 4 and 5 are diagrams each illustrating a screen displaying a same hierarchy level movement or a lower hierarchy level movement based on a depth value of a user input, according to an example embodiment.

FIG. 4 illustrates a screen 440 displaying a same hierarchy level movement using a leftward moving pattern 430 and a rightward moving pattern 420 of a gesture 410 having a hand opening shape without change in a depth value of a gesture input of a user.

In response to a gesture input including a pattern of moving leftward and rightward without change in the depth value of the gesture 410, the gesture input may correspond to the same hierarchy level movement command.

FIG. 5 illustrates a movement of a gesture 510 having a hand opening shape in a direction 520 in which a depth value decreases. Through this, a display may change to a display of files included in a selected folder as shown by a screen 550.

After changing to the screen 550 in response to the movement of the gesture in a direction in which the depth value decreases, a movement between files of the same hierarchy level may be performed based on a pattern 530 of moving the gesture 410 rightward and a pattern 540 of moving the gesture leftward without change in the depth value similarly to the example of FIG. 4.

Despite the same pattern or shape corresponding to the depth value of a gesture, a command may be classified as the same hierarchy level movement or a hierarchy level movement. Thus, the user may deliver the command classified based on the depth value of the gesture to the input processing apparatus 100 through the gesture input.

Also, a first threshold that recognizes a change in the depth value of the gesture input as a hierarchy level movement may be set. For example, when a change in a gesture input depth value is less than the first threshold, a command of the same hierarchy level movement may be performed. Also, when the change in the gesture input depth value is greater than or equal to the first threshold, a command of the hierarchy level movement may be performed. Through this, an unintended hierarchy level movement performed in response to a slight change in the depth value occurring in a gesture inputting process may be prevented.

Figure 6:
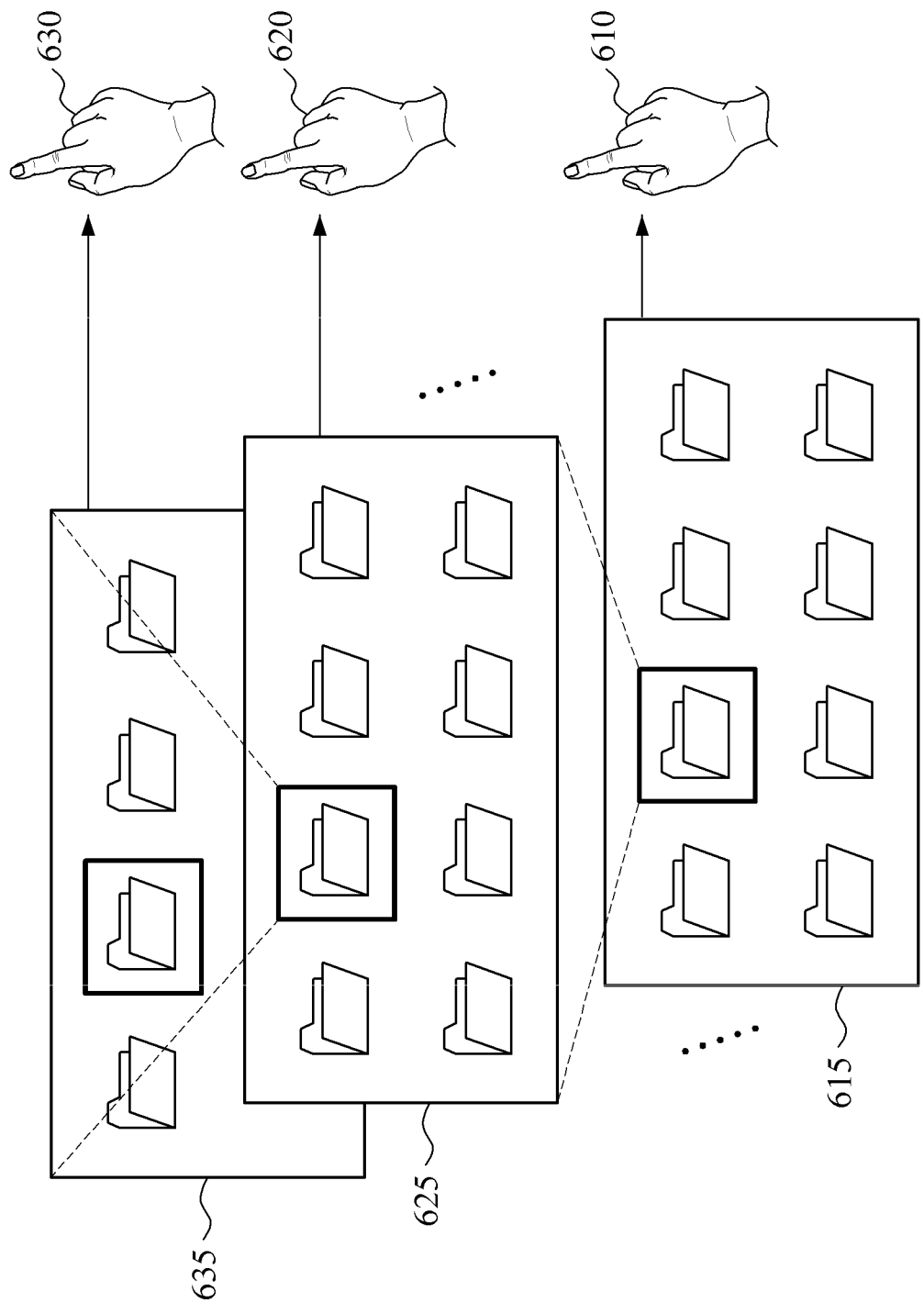
FIG. 6 is a diagram illustrating a movement to each hierarchy level, based on a depth value of a user input, according to an example embodiment.

FIG. 6 is a diagram illustrating a movement to each hierarchy level, based on a depth value of a user input, according to an example embodiment.

When a depth value of a user gesture input 610 corresponds to a depth value of a first hierarchy level 615, the user gesture input 610 may correspond to a first hierarchy level move command.

Also, when a depth value of a user gesture input 620 corresponds to a depth value of a second hierarchy level 625, the user gesture input 620 may correspond to a second hierarchy level move command.

Similarly, when a depth value of a user gesture input 630 corresponds to a depth value of a third hierarchy level 635, the user gesture input 630 may correspond to a third hierarchy level move command.

Figure 7:
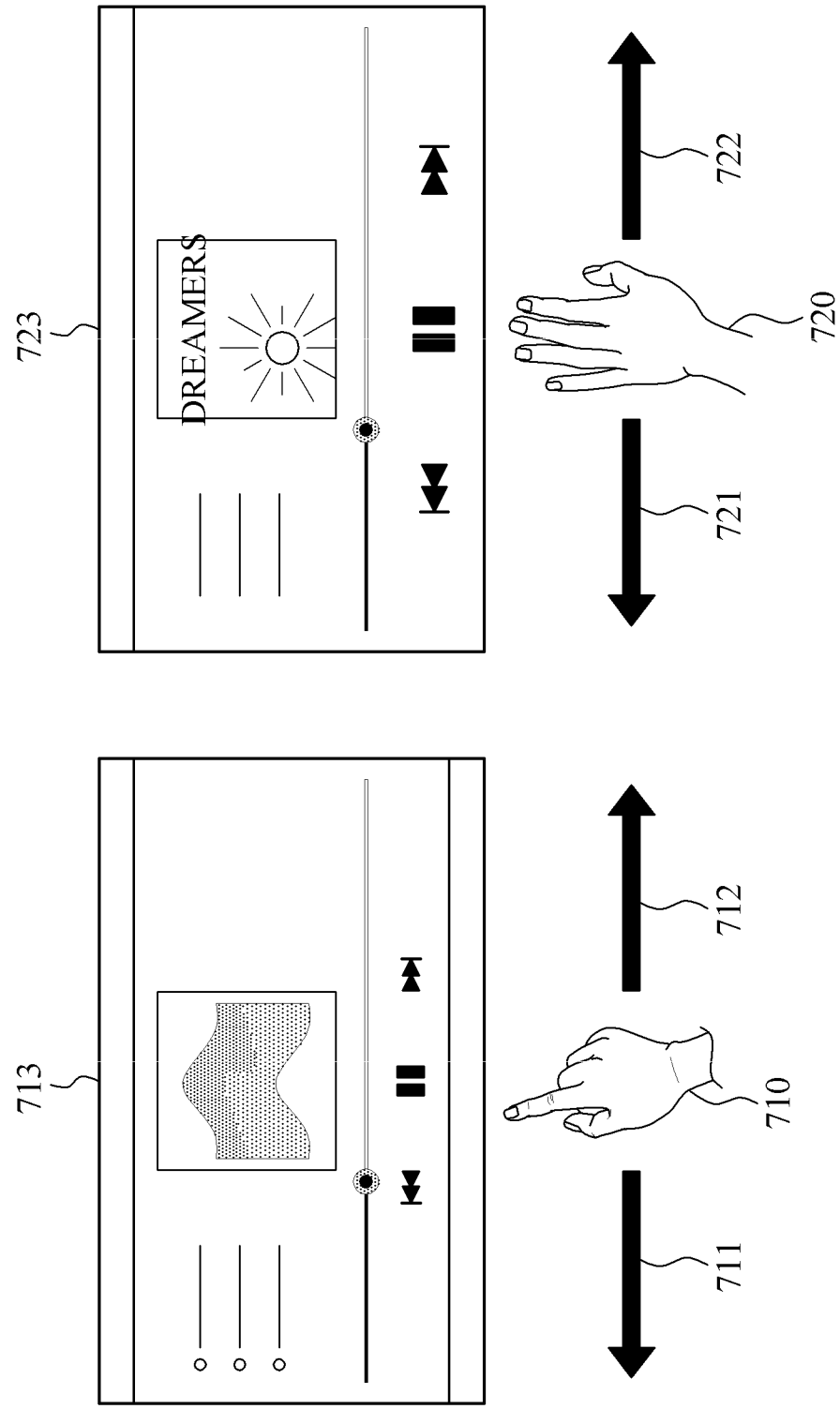
FIG. 7 is a diagram illustrating an execution of a media application, based on a user input, according to an example embodiment.

As such, the depth value may be previously set for each of the first hierarchy level 615, the second hierarchy level 625, and the third hierarchy level 635. Also, a movement to a hierarchy level corresponding to a depth value of a gesture input of a user may be performed directly without need to move to the other hierarchy level FIG. 7 is a diagram illustrating an execution of a media application, based on a user input, according to an example embodiment.

A combination of at least two of a depth value, a shape, and a pattern of a user gesture input may differently correspond to a command based on an application.

In a media application 713, a pointing gesture 710 of a one finger lifting shape may correspond to a content move command to be executed in the media application. A pattern 712 of moving the pointing gesture 710 rightward may be used for a movement to subsequent contents on a playlist, and a pattern 711 of moving the pointing gesture 710 leftward may be used for a movement to previous contents on the playlist.

In a media application 723, a gesture 720 of a hand opening shape may correspond to a category movement command. A movement between categories may be performed based on a pattern 722 of moving the gesture 720 rightward or a pattern 721 of moving the gesture 720 leftward.

In a media application, a different command may also be determined based on the same pattern of a gesture input. Also, a command of a different hierarchy may be determined based on a shape of the gesture input as described above.

Figure 8:
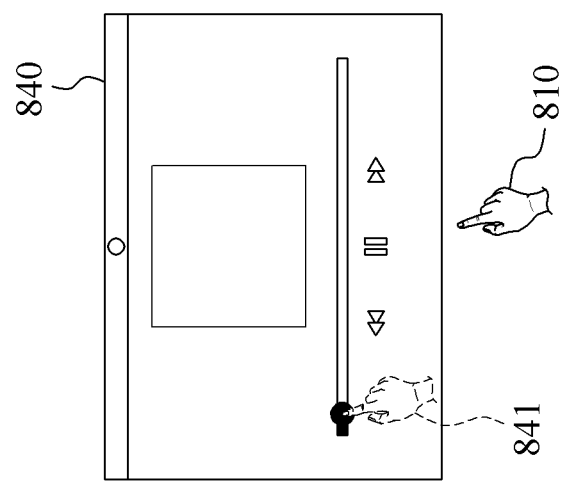
FIG. 8 is a diagram illustrating a process of activating a user interface (UI) object, based on a user input, according to an example embodiment.
Figure 8:
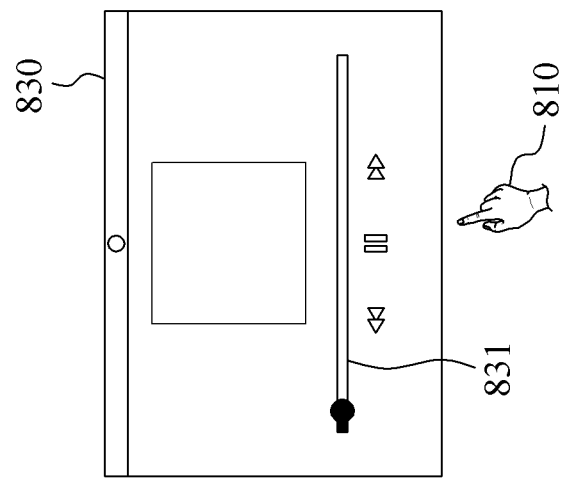
Figure 8:
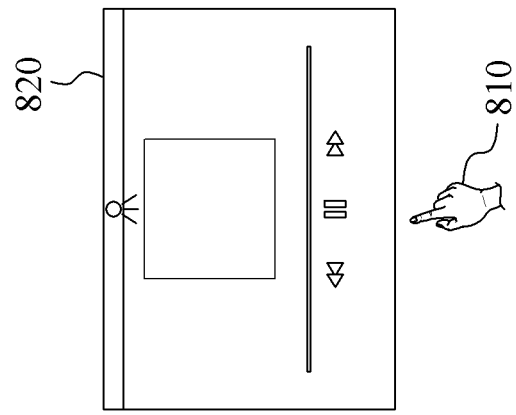

FIG. 8 is a diagram illustrating a process of activating a user interface (UI) object, based on a user input, according to an example embodiment.

In operation 820, a user gesture input may be recognized through an image recognizing sensor included in the input supporting apparatus 100. A depth value, a shape, and a pattern of the recognized gesture input may be identified through the identifier 110. The determiner 120 may determine a command corresponding to a combination of at least two of the identified depth value, shape, and pattern of the gesture input. Also, a different command may be determined for each application.

In operation 830, after determining the command corresponding to the combination of at least two of the depth value, the shape, and the pattern of a gesture input 810, a UI object controlled by the command may be activated. For example, when the gesture input 810 corresponds to a command to adjust a playtime bar 831, the playtime bar 831 may be displayed with a highlighted color. Through this, the user may receive an affordance associated with a function to be executed in an application through the gesture input.

In operation 840, after determining the command corresponding to the combination of at least two of the depth value, the shape, and the pattern of a gesture input 810, a UI object controlled by the command may be highlighted and displayed on a screen. For example, when the gesture input 810 corresponds to a command to adjust a playtime bar, an image 841 obtained by highlighting the gesture input 810 may be displayed on the playtime bar.

When information on a function to be executed through the gesture input 810 is not displayed on the screen, the user may not be previously informed of the function to be executed through the gesture input 810 without actually verifying the function.

As discussed above, the user may receive visual affordance through a UI displaying the function to be executed through the gesture input 810 on the screen. Through this, the user may be previously informed of the function to be executed through the gesture input 810 without actually verifying the function.

Figure 9:
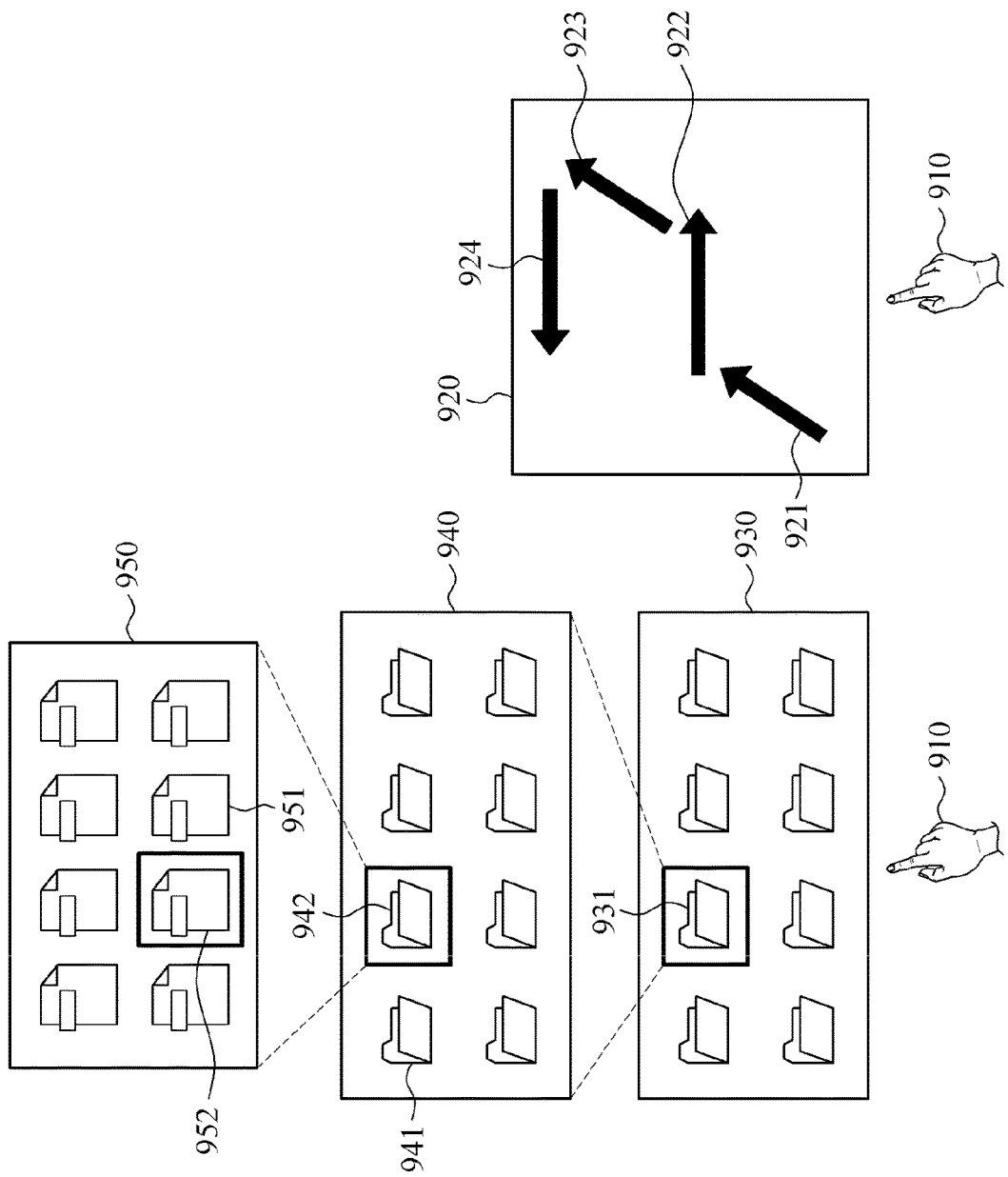
FIG. 9 is a diagram illustrating a procedure of parsing a combination of user inputs into a plurality of sub-combinations and processing the sub-combinations, according to an example embodiment.

FIG. 9 is a diagram illustrating a procedure of parsing a combination of user inputs into a plurality of sub-combinations and processing the sub-combinations, according to an example embodiment.

A gesture input 910 of a user may be formed in a single unit and also be formed as a single continuous gesture input 920. In this example, the parser 130 may perform parsing into sub-combinations 921, 922, 923, and 924 used to classify a combination of at least two of a depth value, a shape, and a pattern of the single continuous gesture input 920 as a single input.

The determiner 120 may determine a command corresponding to each of the sub-combinations 921, 922, 923, and 924. Through this, the commands corresponding to the sub-combinations 921, 922, 923, and 924 may be sequentially executed such that a user desired command is executed through the single continuous gesture input 920.

For example, the sub-combination 921 of the gesture input may correspond to a command of a movement to a lower hierarchy level in a direction in which the depth value decreases. Thus, in operation 930, a folder 931 may be selected and a movement to a lower hierarchy level of the folder 931 may be performed.

In operation 940, the sub-combination 922 of the gesture input may be used to perform a movement from a folder 941 to a folder 942 using a rightward moving pattern without change in the depth value. The sub-combination 923 of the gesture input may correspond to a command of a movement to a lower hierarchy level in a direction in which the depth value decreases. Thus, the folder 942 may be selected and a movement to a lower hierarchy level of the folder 942 may be performed.

In operation 950, the sub-combination 924 of the gesture input may be used to perform a movement from a file 951 to a file 952 using a leftward moving pattern without change in the depth value.

As such, the single continuous gesture input 920 may be divided into the sub-combinations 921, 922, 923, and 924 and a command corresponding to each of the sub-combinations 921, 922, 923, and 924 may be executed. Through this, the user may execute a desired command based on a single continuous gesture without need to repetitively divide the gesture input to be in a single input unit.

Figure 10:
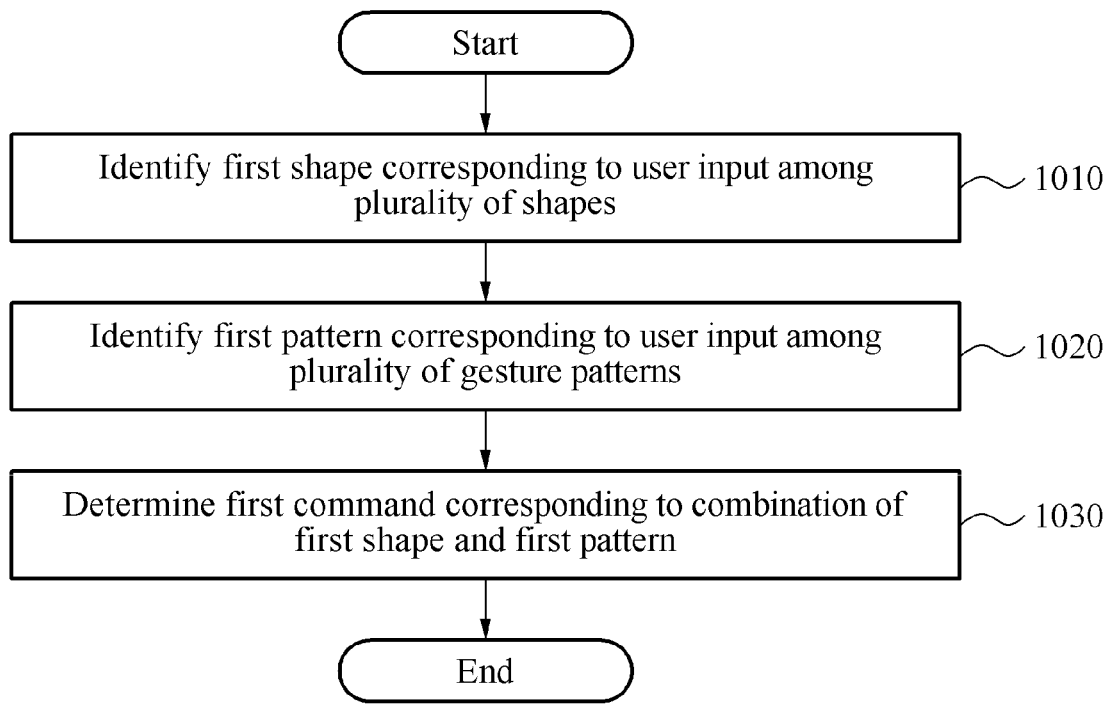
FIG. 10 is a flowchart illustrating a method of determining a command corresponding to a pattern and a shape of a user input, according to an example embodiment.

FIG. 10 is a flowchart illustrating a method of determining a command corresponding to a pattern and a shape of a user input, according to an example embodiment.

In operation 1010, the shape identifier 112 may identify a first shape corresponding to a user input among a plurality of shapes. The shape identifier 112 may sense a gesture input of a user through an image recognizing sensor and identify the first shape corresponding to the gesture input among a plurality of shapes set in advance.

In operation 1020, the pattern identifier 113 may identify a first pattern corresponding to the user input among a plurality of gesture patterns. The pattern identifier 113 may sense the gesture input of the user through the image recognizing sensor and identify the first pattern corresponding to the gesture pattern of the user among a plurality of patterns set in advance.

In operation 1030, the determiner 120 may determine a first command corresponding to a combination of the first shape and the first pattern. A command may also be differently classified based on the first shape despite the same first pattern of the gesture input.

Figure 11:
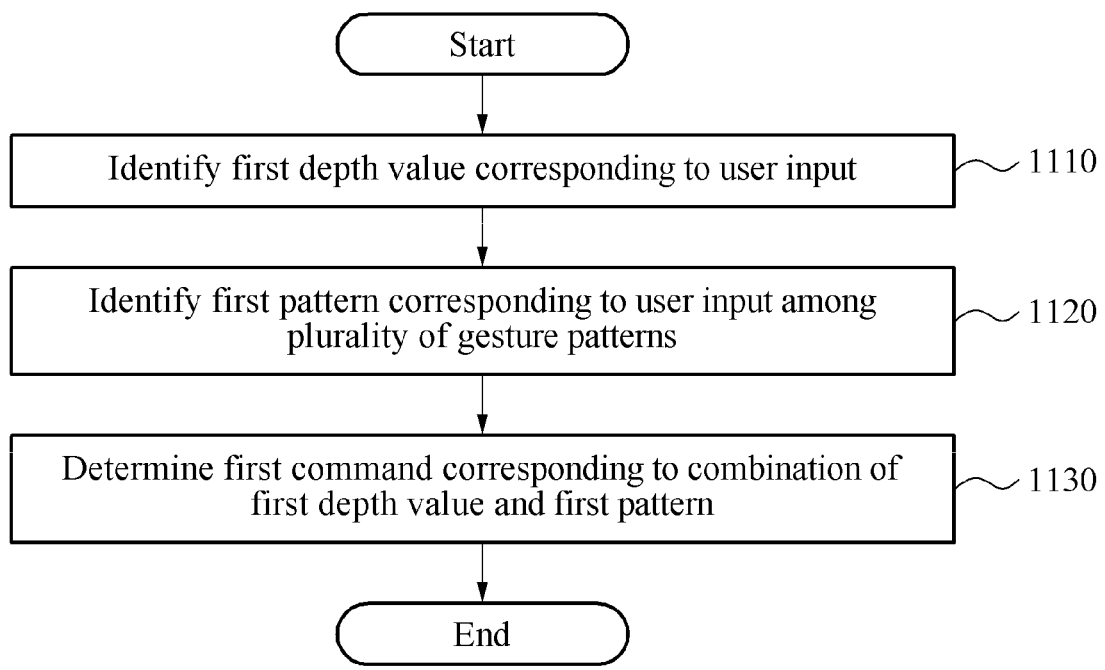
FIG. 11 is a flowchart illustrating a method of determining a command corresponding to a pattern and a depth value of a user input, according to an example embodiment.

FIG. 11 is a flowchart illustrating a method of determining a command corresponding to a pattern and a depth value of a user input, according to an example embodiment.

In operation 1110, the depth identifier 111 may identify a first depth value corresponding to a user input. Because the gesture input is sensed in response to a gesture of a user in a space separating from the input processing apparatus 100, a depth value may be identified based on a distance between the user and the input processing apparatus 100 to classify the gesture input of the user.

In operation 1120, the pattern identifier 113 may identify a first pattern corresponding to the user input among a plurality of gesture patterns. The pattern identifier 113 may sense the gesture input of the user through an image recognizing sensor among a plurality of patterns set in advance. Through this, the pattern identifier 113 may identify the first pattern corresponding to the gesture pattern of the user.

In operation 1130, the determiner 120 may determine a first command corresponding to a combination of a first depth value and the first pattern. For example, a command may be classified based on the first depth value despite the same first pattern of the gesture input of the user.

Also, when the first depth value and a second depth value differing from the first pattern correspond to the user input, a command corresponding to a combination of the second depth value and the first pattern may be determined. Among a plurality of command hierarchies, the command corresponding to the combination of the second depth value and the first pattern may have a hierarchy level differing from that of the first command.

Figure 12:
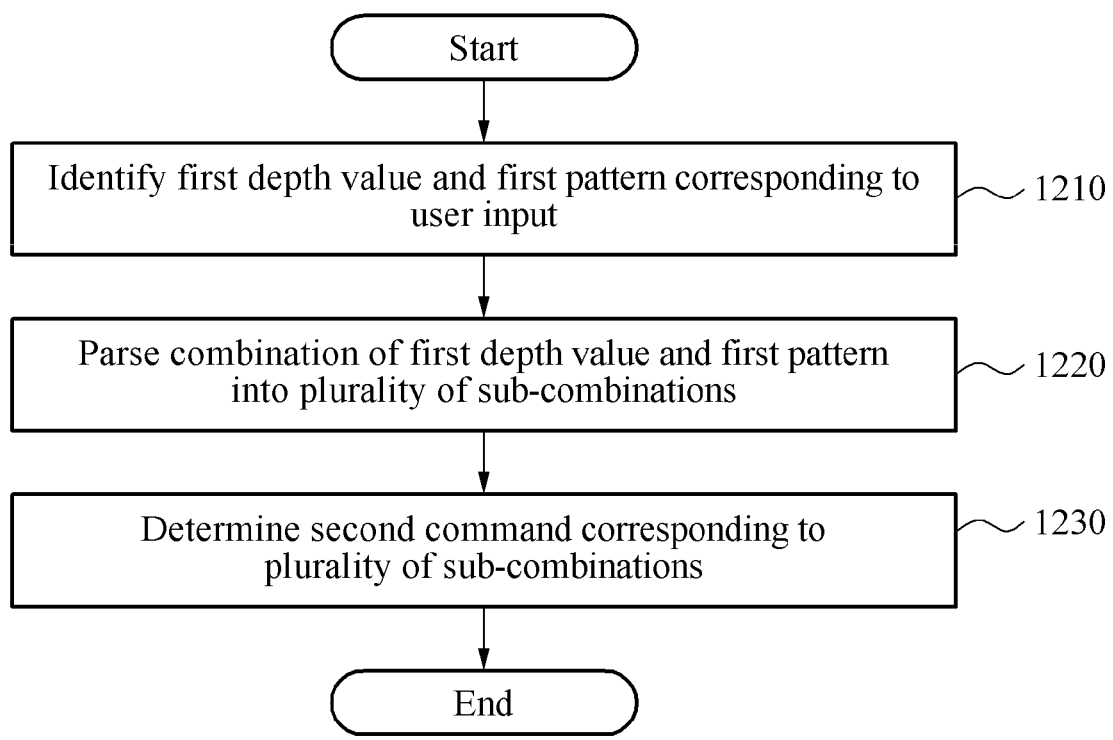
FIG. 12 is a flowchart illustrating a method of parsing a combination of user inputs into sub-combinations and determining a command corresponding to each of the sub-combinations, according to an example embodiment.

FIG. 12 is a flowchart illustrating a method of parsing a combination of user inputs into sub-combinations and determining a command corresponding to each of the sub-combinations, according to an example embodiment.

In operation 1210, the identifier 110 may identify a first depth value and a first pattern corresponding to a user input. As described in an example of FIG. 11, the first depth value and the first pattern of the user input may be identified and a command corresponding to a combination of the first depth value and the first pattern may be determined.

In operation 1220, the parser 130 may parse the combination of the first depth value and the first pattern into a plurality of sub-combinations. A gesture input of a user may be formed in a single unit and also be formed in a continuous motion. In this example, the parser 130 may parse the gesture input into a unit by which a single continuous gesture is classified as a single input.

In operation 1230, the determiner 120 may determine at least one second command corresponding to the plurality of sub-combinations. In response to a determination of the at least one second command corresponding to the plurality of sub-combinations, a second command corresponding to each of the sub-combinations may be executed.

As the foregoing, a single continuous gesture input may be divided into sub-combinations and a command corresponding to each of the sub-combinations may be executed. Through this, the user may execute a desired command based on a single continuous gesture without need to repetitively divide the gesture input to be in a single input unit.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules to perform the operations of the above-described example embodiments, or vice versa.

While this disclosure includes examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. An apparatus for processing an input, the apparatus comprising: a memory storing instructions; and a processor configured to execute the instructions to:
   control a screen to display a plurality of folders;
   recognize a first user input comprising a first movement in a direction toward a first folder from among the plurality of folders on the screen, in which a first depth value decreases;
   determine a first command corresponding to the first user input, wherein the first command comprises a selection of the first folder and a second movement to a lower hierarchy level of the first folder, wherein the lower hierarchy level of the first folder comprises a plurality of UI elements;
   recognize a second user input comprising a first lateral motion without changing a depth value at the lower hierarchy level of the first folder; and
   determine a second command corresponding to the second user input, wherein the second command comprises a third movement from a first UI element from among the plurality of UI elements to a second UI element from among the plurality of UI elements.

2. A method of processing an input, the method comprising:
   displaying a plurality of folders on a screen;
   recognizing a first user input comprising a first movement in a direction toward a first folder from among the plurality of folders on the screen, in which a first death value decreases;
   determining a first command corresponding to the first user input, wherein the first command comprises a selection of the first folder and a second movement to a lower hierarchy level of the first folder, wherein the lower hierarchy level of the first folder comprises a plurality of UI elements;

recognizing a second user input comprising a first lateral motion without changing a depth value at the lower hierarchy level of the first folder; and determining a second command corresponding to the second user input, wherein the second command comprises a third movement from a first UI element from among the plurality of UI elements to a second UI element from among the plurality of UI elements.

* * * * *